US008511790B2

(12) United States Patent
Seki

(10) Patent No.: US 8,511,790 B2
(45) Date of Patent: Aug. 20, 2013

(54) IMAGE PROCESSING METHOD AND IMAGE PROCESSING APPARATUS

(75) Inventor: Satoshi Seki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 118 days.

(21) Appl. No.: 13/204,465

(22) Filed: Aug. 5, 2011

(65) Prior Publication Data

US 2012/0050356 A1     Mar. 1, 2012

(30) Foreign Application Priority Data

Aug. 31, 2010   (JP) .................................. 2010-195057

(51) Int. Cl.
*B41J 2/015*     (2006.01)
(52) U.S. Cl.
USPC .................................. 347/21; 347/5; 347/95
(58) Field of Classification Search
USPC ............... 347/5, 9, 14, 19, 20, 21, 23, 43, 95, 347/98, 100
See application file for complete search history.

(56) References Cited

U.S. PATENT DOCUMENTS

| 7,178,898 B2 * | 2/2007 | Hoshino ......................... 347/40 |
| 7,901,863 B2 | 3/2011 | Yamada et al. |
| 2004/0032473 A1 | 2/2004 | Ishimoto et al. |
| 2009/0322804 A1 | 12/2009 | Usuda et al. |
| 2011/0242176 A1 | 10/2011 | Iritani et al. .................... 347/15 |

FOREIGN PATENT DOCUMENTS

| EP | 1354713 | 10/2003 |
| JP | 2002-307755 | 10/2002 |
| JP | 2005-52984 | 3/2005 |
| RU | 2327195 | 6/2008 |
| WO | 2011-010999 | 1/2011 |

OTHER PUBLICATIONS

European Search Report dated Dec. 17, 2012 in corresponding European Application No. 11006433.4.
Russian Office Action dated Nov. 2, 2012 in corresponding Russian Application No. 2011-136139, with English translation.

* cited by examiner

*Primary Examiner* — Juanita D Jackson
(74) *Attorney, Agent, or Firm* — Fitzpatrick, Cella, Harper & Scinto

(57) ABSTRACT

An image processing method includes a conversion step of converting input image data into ink color data corresponding to respective use amounts of one or more types of color inks and a clear ink. In the conversion step, the input image data is converted into ink color data so that the use amount of the clear ink used in ink color data using a black carbon-containing ink becomes equal to or larger than that of the clear ink used in ink color data using no black carbon-containing ink.

11 Claims, 16 Drawing Sheets

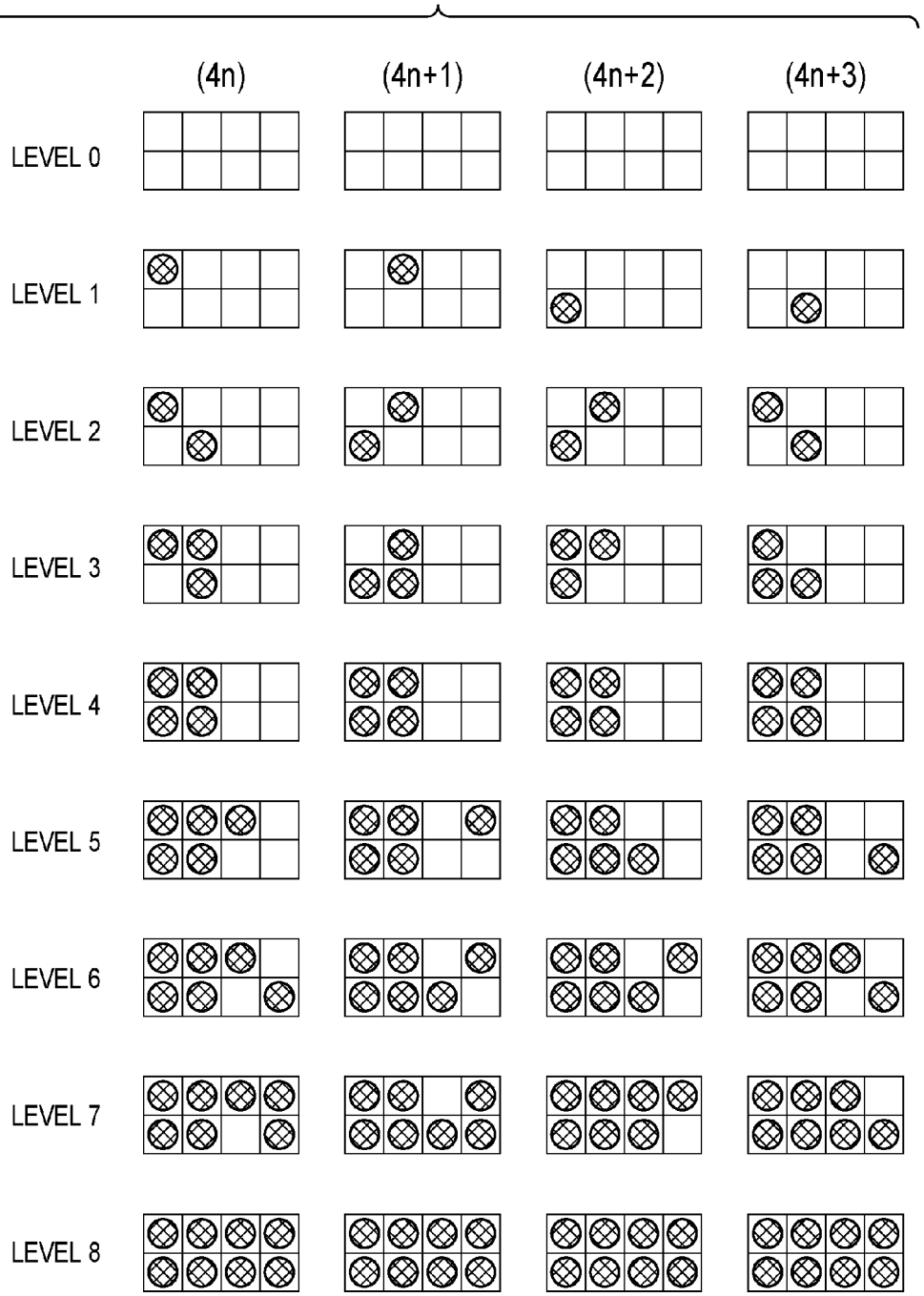
F I G. 3

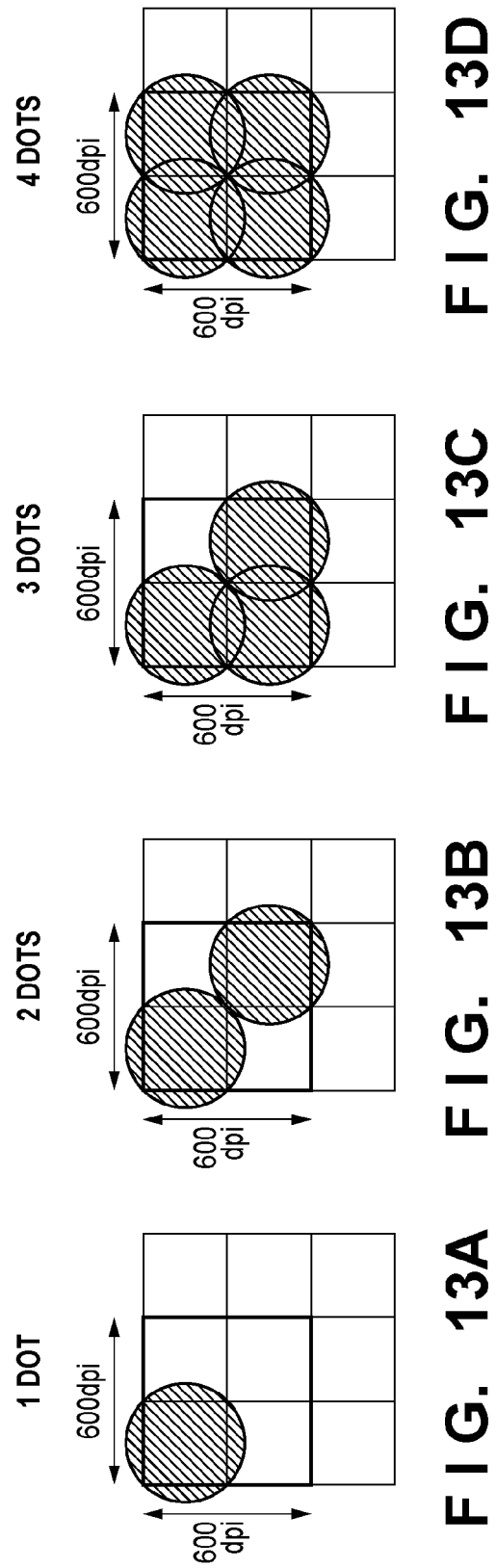

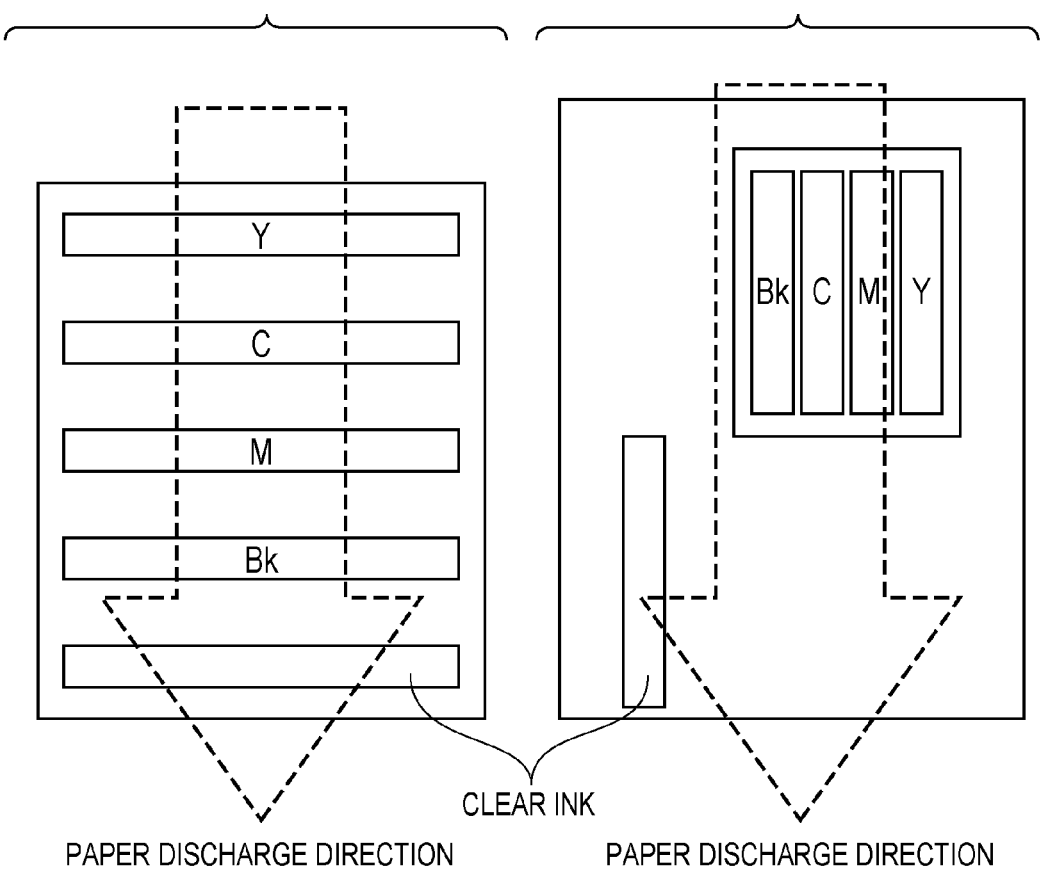

FIG. 17

| | | | | | | INK | | | | |
|---|---|---|---|---|---|---|---|---|---|---|
| | | 1 | 2 | 3 | 4 | 5 | 6 | 7 | 8 | 9 |
| PIGMENT DISPERSION | 1 | 40 | | | | | | | | |
| | 2 | | 8 | | | | | | | |
| | 3 | | | 20 | 8 | | | | | |
| | 4 | | | | | 40 | 40 | 20 | 8 | |
| | 5 | | | | | | | | | 20 |
| GLYCERIN | | 5 | 5 | 5 | 5 | 5 | 5 | 5 | 5 | 5 |
| DIETHYLENE GLYCOL | | 5 | 5 | 5 | 5 | 5 | 5 | 5 | 5 | 5 |
| POLYETHYLENE GLYCOL 1000 | | 5 | 5 | 5 | 5 | 5 | 5 | 5 | 5 | 5 |
| SULFINOL 465 | | 1 | 1 | 1 | 1 | 1 | 1 | 1 | 1 | 1 |
| ION-EXCHANGED WATER | | 44 | 76 | 64 | 76 | 44 | 44 | 64 | 76 | 64 |

IMAGE PROCESSING METHOD AND IMAGE PROCESSING APPARATUS

BACKGROUND OF THE INVENTION

1. Field of the Invention

The present invention relates to an image processing method and image processing apparatus for processing data to be printed with pigment ink.

2. Description of the Related Art

Some printing apparatuses such as a printer, copying machine, and facsimile apparatus are configured to print an image formed from a dot pattern on a printing medium such as paper or a thin plastic plate based on image information. These printing apparatuses are classified by printing method into an inkjet type, wire dot type, thermal type, laser beam type, and the like. Of these printing apparatuses, an inkjet type (inkjet printing apparatus) prints by discharging ink (printing liquid) droplets from the orifices of a printhead onto a printing medium. The inkjet printing apparatus can perform non-contact printing by discharging ink from the printhead and can stably print images on a wide variety of printing media. The inkjet printing apparatus has received attention as a printing apparatus which can meet demands for quick printing, high resolution, high image quality, low noise, and the like.

For ink, pigment ink and dye ink are used. In particular, pigment ink is superior in weather resistance to dye ink and is even recently used in inkjet printing apparatus. Weather resistance includes light resistance, ozone resistance, and water resistance. As a feature, the pigment particle hardly loses color development upon decomposition by light or ozone. Since no color fades even upon long-term exposure to light or ozone, pigment ink exhibits excellent performance when used for outdoor advertisements or exhibitions that are to be displayed over a long period or inkjet photographs that are to be saved for a long term. The pigment particle is water-insoluble and is superior in water resistance to the dye ink. The pigment ink is widely used for general printed materials.

As for the photographic image quality in the inkjet printing apparatus, a quality representation cannot be obtained without a rich gamut at a dark portion. Increasing the ink discharging amount can achieve a high black OD (Optical Density) but without a rich saturation in a dark region. In contrast, increasing the ink density can obtain satisfactory saturation but impairs the reliability of the discharge characteristic. Hence, the black OD and the gamut in a dark region cannot be improved at the same time.

In general, the pigment ink has a property in which the pigment remains on the surface when a pigment ink of a single color is used for glossy paper. When the glossy paper is covered with the pigment, the gloss of the pigment itself becomes dominant and intensifies reflection of light. Here, attention is paid to the fact that the glossiness (light reflection amount) of a pigment black (Bk) ink tends to be high. The OD of the Bk ink generally becomes higher for weaker light reflection, so higher glossiness of the Bk ink results in a lower black OD. To improve the black OD, it is important to lower the glossiness of the Bk ink and suppress reflection of light.

In Japanese Patent Laid-Open Nos. 2002-307755 and 2005-052984, the glossiness is controlled using a clear ink or the like containing no pigment. In Japanese Patent Laid-Open No. 2002-307755, nonuniformity of glossiness between a region where a color ink is printed and a region where no color ink is printed is reduced by printing a clear ink in the region where no color ink is printed. In Japanese Patent Laid-Open No. 2005-052984, a large amount of clear ink is printed in a region where the color ink amount is small. The region where the color ink amount is small is lower in glossiness than a region where the color ink amount is large. For this reason, a large amount of clear ink is printed in the region where the color ink amount is small, increasing the glossiness and reducing nonuniformity of the glossiness within a single image.

However, in these patent literatures, the clear ink is applied by a small amount or is not applied in a region where the discharging amount of a color ink such as Bk ink is large. Hence, no glossiness can be decreased around the darkest portion where the Bk ink discharging amount is large.

SUMMARY OF THE INVENTION

An aspect of the present invention is to eliminate the above-mentioned problems with the conventional technology. The present invention provides an inkjet printing apparatus which superposes a clear ink on an achromatic color ink containing a pigment color material, thereby decreasing the glossiness in a region where the achromatic color ink containing the pigment color material is applied, and improving the black OD and the gamut in a dark region.

The present invention in its first aspect provides an image processing method of processing data for printing an image using a printhead for discharging color inks including an ink containing black carbon as a color material, and a clear ink containing no color material, comprising: a conversion step of converting input image data into ink data corresponding to each of the color inks and the clear ink, wherein the ink data represents a use amount of each of the color inks and the clear ink, wherein the image data includes a first image data to obtain, in the conversion step, a first ink data for using the ink containing the black carbon, and a second image data to obtain, in the conversion step, a second ink data for not using the ink containing the black carbon, wherein, as a result of a conversion of the conversion step, a use amount of the clear ink based on the first ink data becomes equal to or larger than a use amount of the clear ink based on the second ink data.

The present invention in its second aspect provides an image processing apparatus which processes data for printing an image using a printhead for discharging color inks including an ink containing black carbon as a color material, and a clear ink containing no color material, comprising: a conversion unit configured to convert input image data into ink data corresponding to each of the color inks and the clear ink, wherein the ink data represents a use amount of each of the color inks and the clear ink, wherein the image data includes a first image data to obtain, by the conversion unit, a first ink data for using the ink containing the black carbon, and a second image data to obtain, by the conversion unit, a second ink data for not using the ink containing the black carbon, wherein, as a result of a conversion by the conversion unit, a use amount of the clear ink based on the first ink data becomes equal to or larger than a use amount of the clear ink based on the second ink data.

The present invention can superpose a clear ink on an achromatic color ink containing a pigment color material, thereby decreasing the glossiness in a region where the achromatic color ink containing the pigment color material is applied, and improving the black OD and the gamut in a dark region.

Further features of the present invention will become apparent from the following description of exemplary embodiments with reference to the attached drawings.

BRIEF DESCRIPTION OF THE DRAWINGS

FIG. 3 is a view showing output patterns corresponding to input levels 0 to 8 that are converted in dot layout pattern processing;

FIGS. 13A to 13D are views for explaining a case in which a plurality of ink droplets are printed in a pixel;

FIGS. 15A and 15B are views exemplifying a head arrangement in an embodiment;

FIG. 17 is a table showing ink components.

DESCRIPTION OF THE EMBODIMENTS

Figure 1:
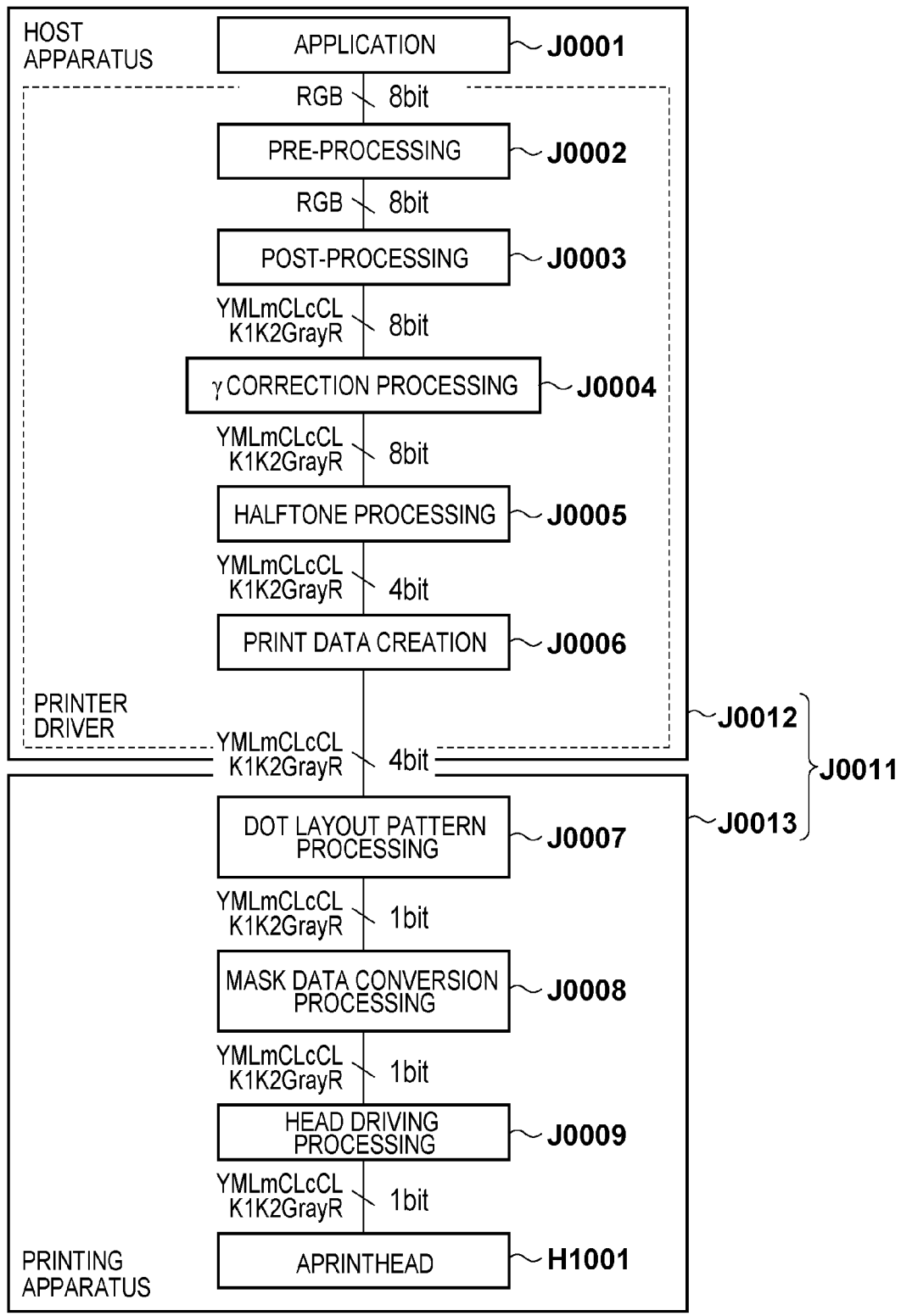
FIG. 1 is a block diagram for explaining the sequence of image data processing.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals denote the same parts, and a repetitive description thereof will be omitted.

First, the arrangement of an apparatus, the ink component composition, and image processing used in an embodiment according to the present invention will be explained.

[1. Basic Arrangement]

[1.1 Outline of Printing System]

FIG. 1 is a block diagram for explaining the sequence of image data processing in a printing system in the embodiment. A printing system J0011 includes a host apparatus J0012 such as a PC and a printing apparatus J0013. The host apparatus J0012 generates image data representing an image to be printed, and sets a UI (User Interface) for data generation. The printing apparatus J0013 prints on a printing medium based on image data generated by the host apparatus J0012.

The printing apparatus J0013 in this example prints with 10 color inks of cyan (C), light cyan (Lc), magenta (M), light magenta (Lm), yellow (Y), red (R), first black (K1), second black (K2), gray (Gray), and clear (CL). In the embodiment, the printing apparatus J0013 uses a printhead H1001 which discharges a total of 10 color inks.

Programs running on the operating system of the host apparatus J0012 include an application and printer driver. An application J0001 executes image data creation processing for printing in the printing apparatus. The host apparatus J0012 receives, via various media, the image data or data before editing or the like. The host apparatus J0012 receives, via a CF card, for example, JPEG image data captured by a digital camera. The host apparatus J0012 receives TIFF image data read by a scanner and image data stored in a CD-ROM. Further, the host apparatus J0012 receives data on a website via the Internet. These received data are displayed on the monitor of the host apparatus J0012, and edited and processed via the application J0001 to create, for example, sRGB image data R, G, and B. On a UI screen displayed on the monitor of the host apparatus J0012, the user sets the type of printing medium used for printing, the print quality, and the like, and issues a print instruction. In accordance with the print instruction, the image data R, G, and B are transferred to the printer driver.

Processing in the printer driver includes pre-processing J0002, post-processing J0003, γ correction processing J0004, halftone processing J0005, and print data creation processing J0006. The processes J0002 to J0006 to be executed by the printer driver will be explained briefly.

(A) Pre-processing J0002

The pre-processing J0002 performs gamut mapping. In the embodiment, data conversion is executed to map a gamut reproduced by sRGB image data R, G, and B in a gamut reproduced by the printing apparatus J0013. More specifically, image data R, G, and B (input image data R, G, and B) each of 256 tone levels expressed by 8 bits are converted into data R, G, and B each of 8 bits in the gamut of the printing apparatus J0013 by using a 3D LUT.

(B) Post-processing J0003

Based on the data R, G, and B each of 8 bits having undergone gamut mapping, the post-processing J0003 obtains color separation data (ink color data) Y, M, Lm, C, Lc, K1, K2, R, Gray, and CL of 10 colors each of 8 bits in correspondence with a combination of inks for reproducing a color represented by these data. CL is a clear ink, and the value of color separation data (ink color data) of each color corresponds to the ink use amount. In the embodiment, color separation data are obtained using interpolation calculation in addition to the 3D LUT, similar to the pre-processing J0002.

(C) γ Correction Processing J0004

The γ correction processing J0004 converts each color data of the color separation data obtained by the post-processing J0003 into a density value (tone value). More specifically, the color separation data is converted to linearly correspond to the tone characteristic of the printer by using a 1D LUT corresponding to the tone characteristic of each color ink in the printing apparatus J0013.

(D) Halftone Processing J0005

The halftone processing J0005 performs quantization to convert each of the color separation data Y, M, Lm, C, Lc, K1, K2, R, Gray, and CL (clear ink) each of 8 bits having undergone the γ correction processing J0004 into 4-bit data. In the embodiment, 8-bit data of 256 tone levels is converted into 4-bit data of nine tone levels by using an error diffusion method. The 4-bit data serves as an index indicating a layout pattern in dot layout pattern processing in the printing apparatus.

(E) Print Data Creation Processing J0006

As final processing performed by the printer driver, the print data creation processing J0006 creates print data by adding print control information to print image data whose content is the 4-bit index data.

Figure 2:
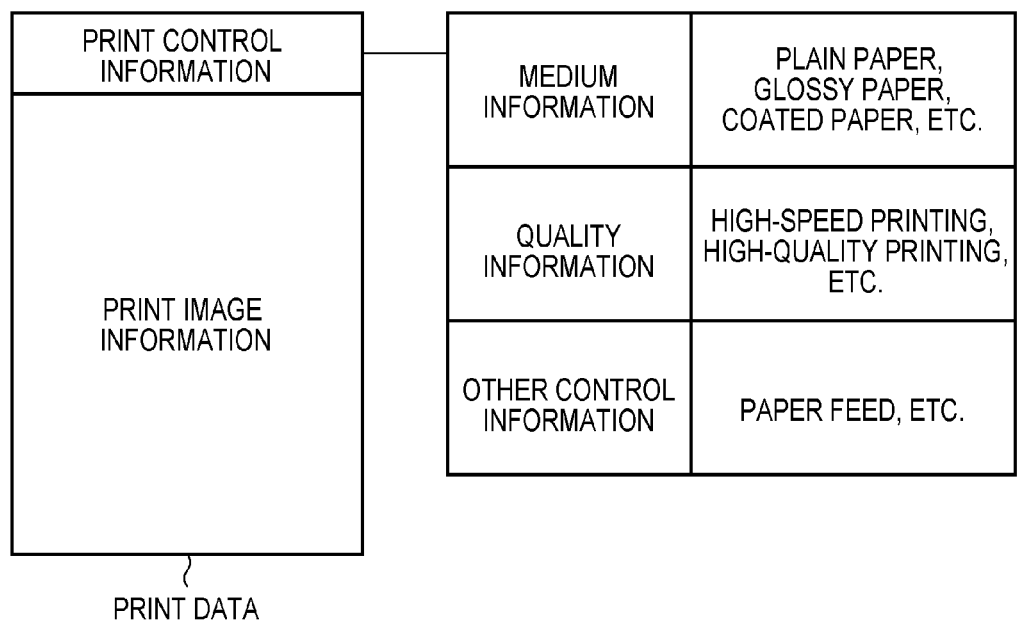
FIG. 2 is a view exemplifying the structure of print data.

FIG. 2 is a view exemplifying the structure of print data. The print data is formed from print control information for controlling printing, and print image information (the above-mentioned 4-bit index data) indicating an image to be printed. The print control information includes "printing medium information", "print quality information", and "other control information" such as the paper feed method. The printing medium information describes the type of printing medium to be printed, and defines any one type of printing medium out of plain paper, glossy paper, postcard, printable disk, and the like. The print quality information describes the print quality, and defines any one type of quality out of "fine", "standard", "quick", and the like. These pieces of print control information are generated based on contents designated by the user on a UI screen displayed on the monitor of the host apparatus J0012. The print image information describes image data generated by the halftone processing J0005. Print data generated in this way is supplied from the host apparatus J0012 to the printing apparatus J0013.

The printing apparatus J0013 performs dot layout pattern processing J0007 and mask data conversion processing J0008 (to be described below) for the print data supplied from the host apparatus J0012.

(F) Dot Layout Pattern Processing J0007

The halftone processing J0005 decreases multi-valued density information (8-bit data) of 256 tone levels to tone value information (4-bit data) of 9 tone levels. However, data which can be actually printed by the printing apparatus J0013 is binary data (1-bit data) indicating whether to print an ink dot. The dot layout pattern processing J0007 assigns a dot layout pattern corresponding to the tone value (one of levels 0 to 8) of each pixel to the pixel expressed by 4-bit data of one of tone levels 0 to 8 that is an output value from the halftone processing J0005. In this manner, whether to print an ink dot (ON/OFF of a dot) is defined in each of a plurality of areas within one pixel, and 1-bit binary data "1" or "0" is arranged in each area within one pixel. "1" is binary data indicating to print a dot, and "0" is binary data indicating not to print a dot.

FIG. 3 shows output patterns corresponding to input levels 0 to 8 that are converted in the dot layout pattern processing J0007 in this example. Level values shown on the left side in FIG. 3 correspond to levels 0 to 8 which are output values from the halftone processing J0005 in the host apparatus J0012. A region of 2×4 areas in the right side corresponds to the region of one pixel output from the halftone processing J0005. Each area within one pixel corresponds to a minimum unit for which ON/OFF of a dot is defined. In this specification, the "pixel" is a minimum unit capable of a tone representation, and is a minimum unit to undergo image processes (for example, the pre-processing J0002 to halftone processing J0005) for multi-valued data of a plurality of bits.

Referring to FIG. 3, an area indicated by ○ is an area to print a dot. As the level number rises, the number of dots to be printed increases one by one. In the embodiment, density information of an original image is reflected finally in this form. In FIG. 3, "(4n)" to "(4n+3)" indicate pixel positions in the lateral direction from the left end of image data to be printed, by substituting an integer of 1 or more into n. Respective patterns below "(4n)" to "(4n+3)" mean that different patterns are prepared for respective pixel positions even at the same input level. That is, even when the same level is input, four types of dot layout patterns indicated by "(4n)" to "(4n+3)" are cyclically assigned on a printing medium.

In FIG. 3, the longitudinal direction is a direction in which the orifices of the printhead are arrayed, and the lateral direction is a printhead scanning direction. The arrangement which prints using different dot layouts even for the same level has an effect of distributing the ink discharge count between nozzles on the upper stage of the dot layout pattern and those on the lower stage. Further, this arrangement has an effect of distributing various noise components specific to the printing apparatus J0013. At the end of the dot layout pattern processing J0007, all dot layout patterns for a printing medium are determined.

(G) Mask Data Conversion Processing J0008

The dot layout pattern processing J0007 determines the presence/absence of a dot in each area on a printing medium. Binary data indicating the dot layout is input to the driving circuit of the printhead H1001, and a desired image can be printed in head driving processing J0009. In this case, so-called 1-pass printing can be executed by completing printing in a single scan region on a printing medium by one scan. However, so-called multi-pass printing in which printing in a single scan region on a printing medium is completed by a plurality of scans will be exemplified below.

Figure 4:
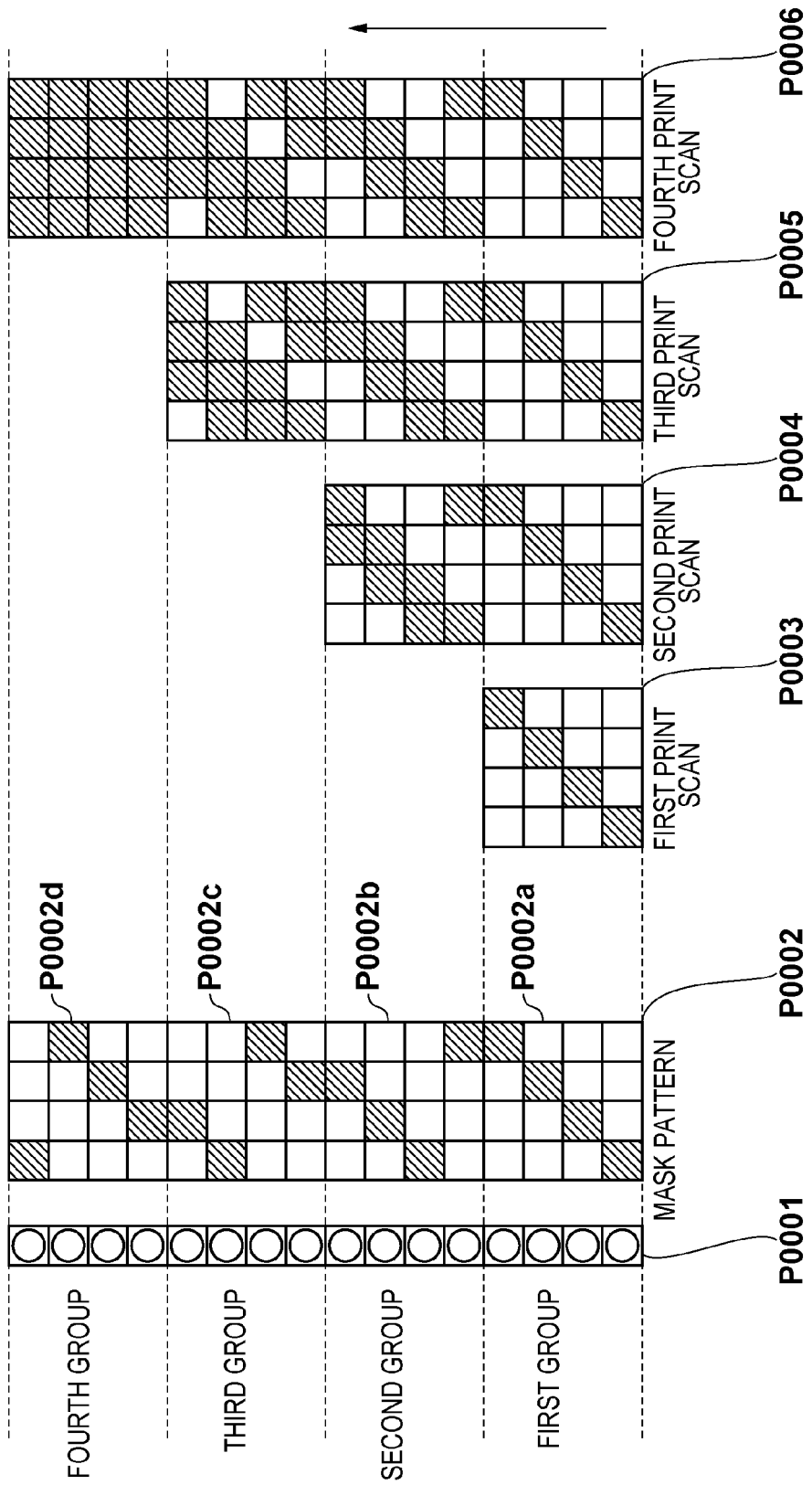
FIG. 4 is a view schematically showing a printhead and printing pattern.

FIG. 4 schematically shows a printhead and printing pattern to explain the multi-pass printing method. The printhead H1001 in the embodiment has a nozzle array including 768 nozzles in practice. However, for simplicity, assume that the printhead H1001 has 16 nozzles. The nozzles are divided into four, first to fourth nozzle groups, as shown in FIG. 4, and each nozzle group includes four nozzles. A mask pattern P0002 is formed from first to fourth mask patterns P0002a to P0002d. The first to fourth mask patterns P0002a to P0002d define areas printable by the first to fourth nozzle groups. A solid area in the mask pattern is a printing-permitted area, and a blank area is a printing-inhibited area. The first to fourth mask patterns P0002a to P0002d are complementary to each other. These four mask patterns are superposed, completing printing in a region corresponding to 4×4 areas.

Patterns P0003 to P0006 show states in which an image is completed by repeating the print scan. Every time the print scan ends, the printing medium is conveyed by the width (four nozzles in FIG. 4) of the nozzle group in a direction indicated by the arrow in FIG. 4. An image is completed by four print scans in a single region (region corresponding to the width of each nozzle group) on a printing medium. Nozzle-specific variations, variations of the printing medium conveyance precision, and the like can be reduced by forming a single image region on a printing medium by a plurality of scans using a plurality of nozzle groups in this fashion.

Figure 5:
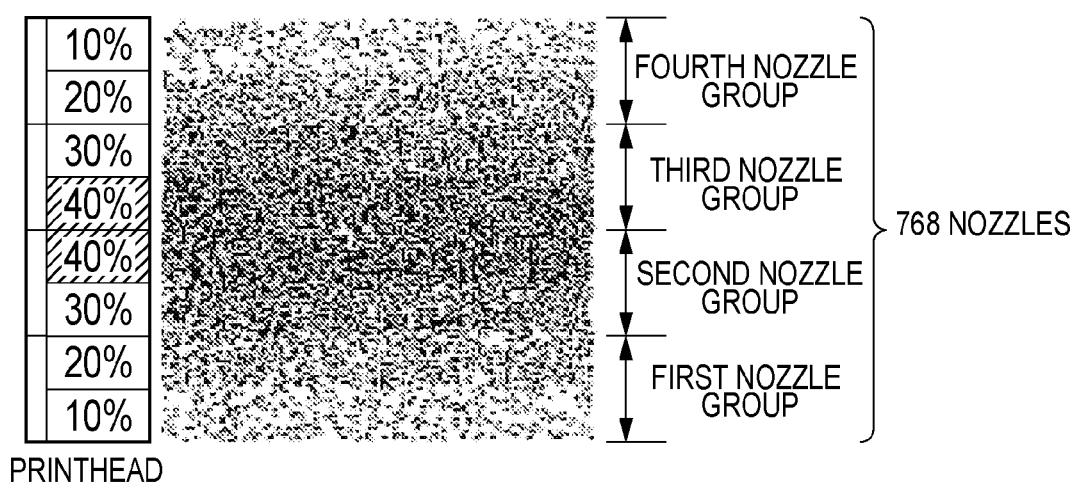
FIG. 5 is a view exemplifying an applicable mask pattern.

FIG. 5 exemplifies a mask pattern actually applicable in the embodiment. The printhead H1001 applied in this example has 768 nozzles, and 192 nozzles belong to each of the four nozzle groups. The mask pattern dimensions are defined by 768 areas equal to the number of nozzles in the longitudinal direction and 256 areas in the lateral direction. Four mask patterns respectively corresponding to the four nozzle groups are complementary to each other.

It is known that an air flow is generated near the printing unit in a print operation and affects the discharge direction of ink especially from nozzles positioned at the end of the printhead when discharging many small droplets from the inkjet printhead at high frequency. As is apparent from FIG. 5, the mask pattern in the embodiment localizes the distribution of the printing permission ratio between the respective nozzle groups or between regions even in a single nozzle group. An adverse effect by a shift of the landing positions of ink droplets discharged from nozzles at the end can be made less conspicuous by applying a mask pattern in which the printing permission ratio of nozzles at the end is set lower than that at the center, as shown in FIG. 5.

The printing permission ratio defined by the mask pattern is given by printing-permitted areas (solid areas in the mask pattern P0002 of FIG. 4) and printing-inhibited areas (blank areas in the mask pattern P0002 of FIG. 4). That is, the printing permission ratio is the percentage expression of the ratio of the number of printing-permitted areas to the sum of the numbers of printing-permitted areas and printing-inhibited areas which form the mask pattern. Letting M be the number of printing-permitted areas of the mask pattern and N be that of printing-inhibited areas, the printing permission ratio (%) of the mask pattern is M÷(M+N)×100.

In the embodiment, the memory in the printing apparatus main body stores mask data as shown in FIG. 5. The mask data conversion processing J0008 ANDs the mask data and binary data obtained by the dot layout pattern processing J0007, determining binary data to be printed by each print scan. This binary data is transferred to the head driving processing J0009. Then, the printhead H1001 is driven to discharge ink in accordance with the binary data. In multi-pass printing, the print data generation method coping with a plurality of scans is not limited to the above form in which data is divided based on the mask pattern. For example, print data coping with a plurality of scans may be generated in the dot layout pattern processing J0007 by giving the dot pattern not only with a function of determining whether to discharge ink but also with a function of designating the ordinal number of a scan to print discharged ink.

In FIG. 1, the host apparatus J0012 executes the pre-processing J0002, post-processing J0003, γ correction processing J0004, halftone processing J0005, and print data creation processing J0006. The printing apparatus J0013 executes the dot layout pattern processing J0007 and mask data conversion processing J0008. However, the printing apparatus J0013 may execute some of the processes J0002 to J0005 which are executed in the host apparatus J0012, or the host apparatus J0012 may execute all of them. Alternatively, the printing apparatus J0013 may execute the processes J0002 to J0008.

[1.2 Apparatus Arrangement]

Figure 6:
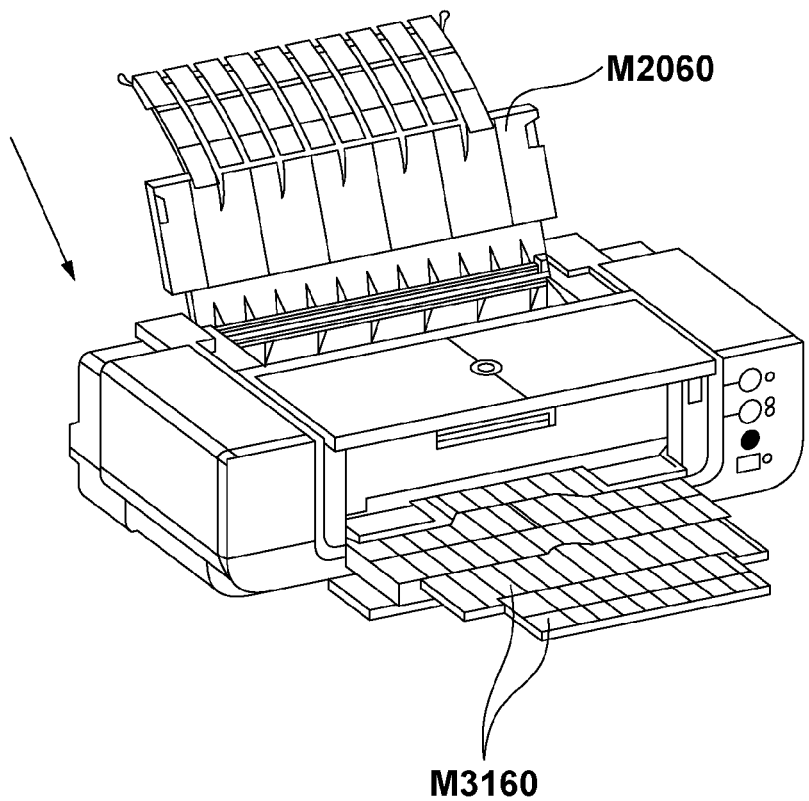
FIG. 6 is a perspective view showing the outer appearance of an inkjet printing apparatus.
Figure 7:
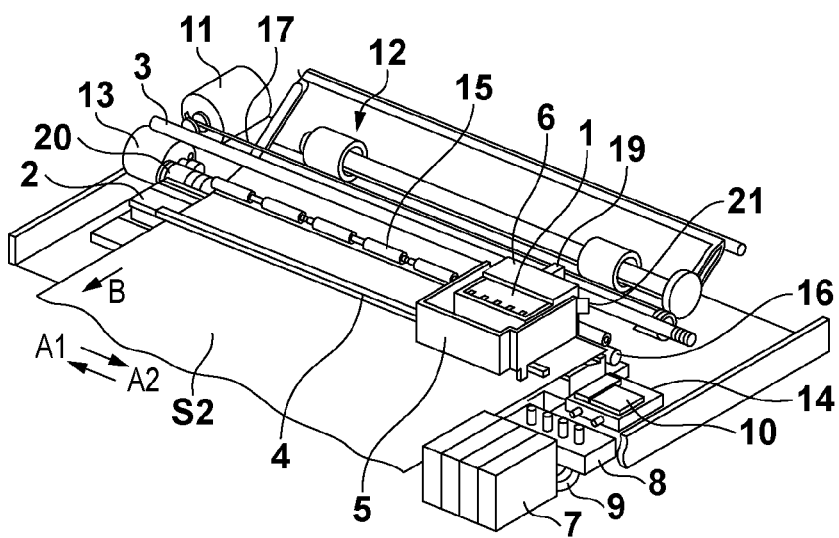
FIG. 7 is a perspective view showing the interior of the inkjet printing apparatus.

FIG. 6 is a perspective view showing the outer appearance of an inkjet printing apparatus in the embodiment. FIG. 7 is a perspective view showing the interior of the inkjet printing apparatus.

In the embodiment, a printing medium is inserted from a paper feed tray 12 in a direction indicated by the arrow in FIG. 6, intermittently conveyed to form an image, and then discharged onto a discharge tray M3160.

Referring to FIG. 7, a printhead 1 mounted on a carriage 5 discharges ink from nozzles while reciprocating along a guide rail 4 in directions indicated by arrows A1 and A2, thereby forming an image on a printing medium S2. The printhead 1 has, for example, a plurality of nozzle arrays corresponding to inks of different colors and an image quality improvement liquid. An example is a group of nozzle arrays for discharging one or more types of inks of cyan (C), magenta (M), yellow (Y), black 1 (K1), black (K2), light cyan (LC), light magenta (LM), red (R), gray (Gray), and clear (CL). These color inks and image quality improvement liquid are stored in ink tanks (not shown) and supplied from the ink tanks to the printhead 1.

In the embodiment, the ink tanks and printhead 1 are integrated to form a head cartridge 6, and the head cartridge 6 is mounted on the carriage 5. A timing belt 17 transfers the driving force of a carriage motor 11 to the carriage 5 to reciprocate the carriage 5 along a guide shaft 3 and the guide rail 4 in the directions (main scanning direction) indicated by the arrows A1 and A2. When the carriage moves, an encoder sensor 21 attached to the carriage 5 reads a linear scale 19 arranged in the carriage moving direction, detecting the carriage position. By the reciprocal movement, printing on a printing medium starts. At this time, the printing medium S2 is supplied from the paper feed tray 12, clamped between a conveyance roller 16 and a pinch roller 15, and conveyed to a platen 2.

After the carriage 5 prints by one scan in the direction A1, a conveyance motor 13 drives the conveyance roller 16 via a linear wheel 20. Then, the printing medium S2 is conveyed by a predetermined amount in a direction indicated by an arrow B serving as the sub-scanning direction. While the carriage 5 scans in the direction A2, printing is done on the printing medium S2. At the home position, a head cap 10 and recovery unit 14 are arranged to perform recovery processing intermittently for the printhead 1, as needed. By repeating this operation, printing of one printing medium ends. After that, the printing medium is discharged, completing printing of one printing medium.

Figure 8:
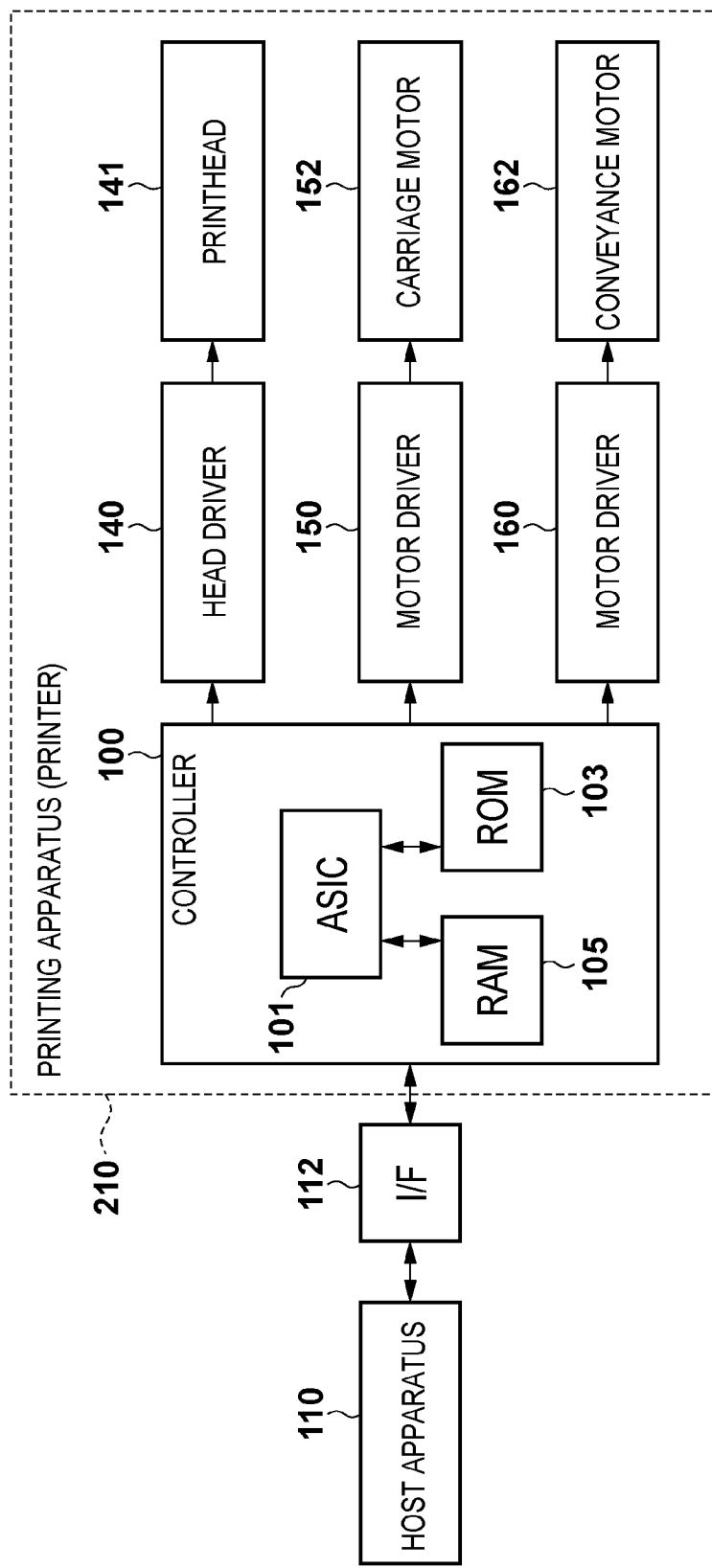
FIG. 8 is a block diagram showing the control arrangement of the inkjet printing apparatus.

FIG. 8 is a block diagram showing the control arrangement of the inkjet printing apparatus in the embodiment. A controller 100 of a printing apparatus 210 is a main control unit and includes, for example, an ASIC 101, ROM 103, and RAM 105 to configure a microcomputer. The ROM 103 stores a dot layout pattern, mask pattern, and other permanent data. The RAM 105 has an area for rasterizing image data, a work area, and the like. The ASIC 101 executes a series of processes to read out a program from the ROM 103 and print image data on a printing medium. More specifically, a mask pattern is selected from information corresponding to the ink discharging amount to divide image data, generating print data for each pass. A host apparatus 110 is an image data supply source to be described later, and may take the form of an image reader or the like in addition to a computer which, for example, creates and processes image data to be printed. The host apparatus 110 transmits/receives image data, other commands, status signals, and the like to/from the controller 100 via an interface (I/F) 112. A head driver 140 drives a printhead 141 in accordance with print data or the like. A motor driver 150 drives a carriage motor 152, and a motor driver 160 drives a conveyance motor 162.

[1.3 Relationship Between Glossiness and Image Clarity]

<Evaluation Method for Glossiness and Image Clarity>

Glossiness and image clarity on the printing medium surface will be explained as criteria for evaluating glossiness uniformity within an image in the embodiment. Glossiness and image clarity are indices for evaluating the gloss of a printing medium or image. An evaluation method for glossiness and image clarity, and the relationship between them will be explained below.

Figure 9A:
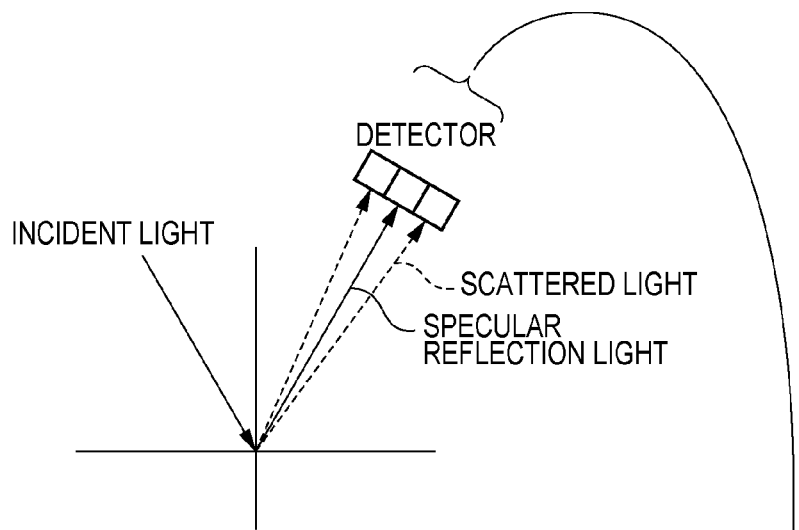
FIGS. 9A to 9D are views for explaining glossiness and haze.

In FIGS. 9A to 9D are views for explaining glossiness and haze. As shown in FIG. 9A, the values of a 20° specular glossiness (to be simply referred to as glossiness) and haze can be obtained by detecting light reflected by the surface of a printed material using a general detector. The reflected light is distributed at a given angle using the axis of specular reflection light as the center. As shown in 9D, the glossiness is detected at, for example, an opening width of 1.8° at the center of the detector, and haze is detected within the range of ±2.7° outside the opening. More specifically, when reflected light is observed, the reflectance of specular reflection light serving as the central axis of the distribution with respect to incident light is defined as glossiness. Scattered light generated near the specular reflection light in the reflected light distribution is measured and defined as haze or a haze value. The units of glossiness and haze measured by the detector are dimensionless. Glossiness complies with JIS K 5600, and haze complies with ISO DIS 13803. Image clarity is measured using, for example, JIS H 8686 "Test methods for image clarity of anodic oxide coatings on aluminum and aluminum alloy" or JIS K 7105 "Testing methods for optical properties of plastics". Image clarity indicates the sharpness of an image reflected in a printing medium. For example, when an illumination image reflected in a printing medium blurs, the image clarity value is small.

Figure 9B:
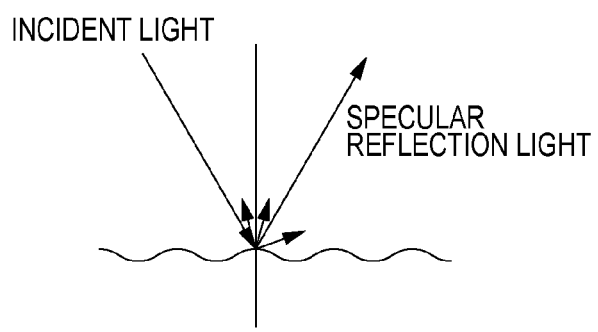
Figure 9D:
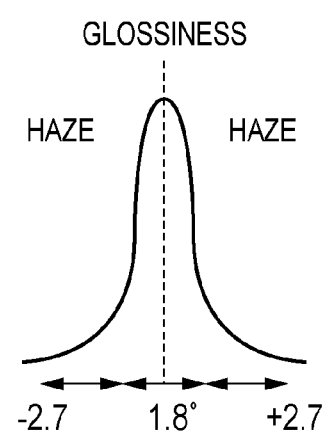
Figure 9C:
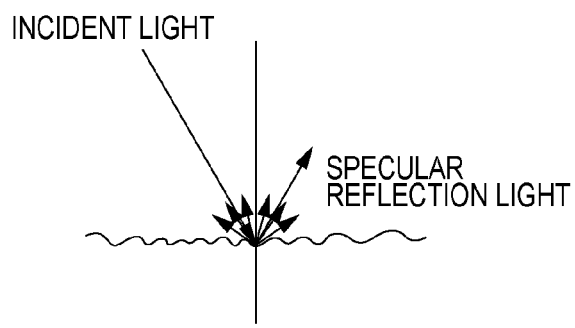

FIGS. 9B and 9C are views showing that the quantity and direction of reflected light change depending on the surface roughness of a printed image. As is shown in FIGS. 9B and 9C, a rougher surface generally diffuses reflected light much more to decrease the quantity of specular reflection light, and image clarity and glossiness are measured to be smaller. In the embodiment, a smaller measurement value of a measured image clarity than a target image clarity will be expressed as low image clarity. Also, a smaller measurement value of a measured glossiness than a target glossiness will be expressed as low glossiness.

<Ink Composition>

A color ink (to be referred to as an ink) containing a pigment color material and an image quality improvement liquid, which are used in the inkjet printing apparatus according to the embodiment, will be explained.

First, the components of inks will be explained.

(Aqueous Medium)

An ink adopted in the present invention preferably uses an aqueous medium containing water and a water-soluble organic solvent. The content (mass %) of the water-soluble organic solvent in the ink is preferably equal to or higher than 3.0 mass % and equal to or lower than 50.0 mass % with respect to the total mass of the ink. The content (mass %) of water in the ink is preferably equal to or higher than 50.0 mass % and equal to or lower than 95.0 mass % with respect to the total mass of the ink.

Examples of the water-soluble organic solvent are as follows: alkyl alcohols having 1 to 6 carbon atoms such as methanol, ethanol, propanol, propanediol, butanol, butanediol, pentanol, pentanediol, hexanol, and hexanediol; amides such as dimethylformamide and dimethylacetamide; ketones or ketoalcohols such as acetone and diacetone alcohol; ethers such as tetrahydrofuran and dioxane; polyalkylene glycols having average molecular weights of 200, 300, 400, 600, 1,000, and the like such as polyethylene glycol and polypropylene glycol; alkylene glycols having an alkylene group having 2 to 6 carbon atoms such as ethylene glycol, propylene glycol, butylene glycol, triethylene glycol, 1,2,6-hexantriol, thiodiglycol, hexylene glycol, and diethylene glycol; lower alkyl ether acetates such as polyethylene glycol monomethyl ether acetate; glycerin; lower alkyl ethers of polyalcohols such as ethylene glycol monomethyl (or ethyl)ether, diethylene glycol methyl (or ethyl)ether, and triethylene glycol monomethyl (or ethyl)ether; and N-methyl-2-pyrrolidone, 2-pyrrolidone, 1,3-dimethyl-2-imidazolidinon, and the like. As water, deionized water (ion-exchanged water) is preferably used.

(Pigment)

As the pigment, carbon black or an organic pigment is preferably used. The content (mass %) of the pigment in the ink is preferably equal to or higher than 0.1 mass % and equal to or lower than 15.0 mass % with respect to the total mass of the ink.

The black ink preferably uses, as the pigment, carbon black such as furnace black, lampblack, acetylene black, or channel black. Examples of the black ink are the following commercial products: Raven: 7000, 5750, 5250, 5000ULTRA, 3500, 2000, 1500, 1250, 1200, 1190ULTRA-II, 1170, 1255 (all of which are available from Columbia); BLACK PEARLS L, REGAL: 330R, 400R, 660R, MOGUL L, MONARCH: 700, 800, 880, 900, 1000, 1100, 1300, 1400, 2000, VULCAN XC-72R (all of which are available from Cabot); Color Black: FW1, FW2, FW2V, FW18, FW200, S150, S160, S170, Printex: 35, U, V, 140U, 140V, Special Black: 6, 5, 4A, 4 (all of which are available from Degussa); and No. 25, No. 33, No. 40, No. 47, No. 52, No. 900, No. 2300, MCF-88, MA600, MA7, MA8, MA100 (all of which are available from Mitsubishi Chemical). Carbon black newly prepared for the present invention is also available. Needless to say, the present invention is not limited to these examples, and can adopt any conventional carbon black. The black ink is not limited to the carbon black, and may use, as the pigment, a magnetic fine particle (for example, magnetite or ferrite), titanium black, or the like.

Examples of the organic pigment are as follows: water-insoluble azo pigments such as toluidine red, toluidine maroon, Hansa yellow, benzidine yellow, and pyrazolone red; water-soluble azo pigments such as lithol red, helio bordeaux, pigment scarlet, and permanent red 2B; derivatives from vat dyes such as alizarin, indanthrone, and thioindigo maroon; phthalocyanine-based pigments such as phthalocyanine blue and phthalocyanine green; quinacridone-based pigments such as quinacridone red and quinacridone magenta; perylene-based pigments such as perylene red and perylene scarlet; isoindolinone-based pigments such as isoindolinone yellow and isoindolinone orange; imidazolone-based pigments such as benzimidazolone yellow, benzimidazolone orange, and benzimidazolone red; pyran-throne-based pigments such as pyran-throne red and pyran-throne orange; indigo-based pigments, condensed azo-based pigments, thioindigo-based pigments, and diketopyrrolopyrrole-based pigments; and flavanthrone yellow, acylamide yellow, quinophtalone yellow, nickel azo yellow, copper azomethine yellow, perinone orange, anthrone orange, dianthraquinonyl red, and dioxazine violet. However, the present invention is not limited to them.

When an organic pigment is indicated by a color index (C.I.) number, the following pigments are available: C.I. pigment yellow: 12, 13, 14, 17, 20, 24, 74, 83, 86, 93, 97, 109, 110, 117, 120, 125, 128, 137, 138, 147, 148, 150, 151, 153, 154, 166, 168, 180, 185, and the like; C.I. pigment orange: 16, 36, 43, 51, 55, 59, 61, 71, and the like; C.I. pigment red: 9, 48, 49, 52, 53, 57, 97, 122, 123, 149, 168, 175, 176, 177, 180, 192, 215, 216, 217, 220, 223, 224, 226, 227, 228, 238, 240, 254, 255, 272, and the like; C.I. pigment violet: 19, 23, 29, 30, 37, 40, 50, and the like; C.I. pigment blue: 15, 15:1, 15:3, 15:4, 15:6, 22, 60, 64, and the like; C.I. pigment green: 7, 36, and the like; and C.I. pigment brown: 23, 25, 26, and the like. Needless to say, the present invention is not limited to them.

(Dispersant)

As the dispersant for dispersing the above-mentioned pigment in an aqueous medium, any water-soluble resin is available. Preferable examples are especially dispersants having a weight-average molecular weight of 1,000 (inclusive) to 30,000 (inclusive), and more preferably, 3,000 (inclusive) to 15,000 (inclusive). The content (mass %) of the dispersant in the ink is preferably equal to or higher than 0.1 mass % and equal to or lower than 5.0 mass % with respect to the total mass of the ink.

Examples of the dispersant are as follows: styrene, vinyl-naphthalene, aliphatic alcohol esters of $\alpha,\beta$-ethylenically unsaturated carboxylic acids, acrylic acid, maleic acid, itaconic acid, fumaric acid, vinyl acetate, vinyl pyrrolidone, acrylamide, and polymers containing derivatives of them as monomers. Note that one or more monomers which compose a polymer are preferably hydrophilic monomers, and a block copolymer, random copolymer, graft copolymer, or salts of them may also be used. Natural resins such as rosin, shellac, and starch are also available. These resins are preferably soluble in a base-dissolved aqueous solution, that is, are alkali soluble resins.

(Surfactant)

To adjust the surface tension of an ink which forms an ink set, surfactants such as an anionic surfactant, nonionic surfactant, and ampholytic surfactant are preferably used. Examples are polyoxyethylene alkyl ether, polyoxyethylene alkyl phenols, acetylene glycol compounds, and acetylene glycol ethylene oxide adducts.

(Other Components)

In addition to the above components, an ink which forms an ink set may contain a moisturizing solid content such as urea, urea derivatives, trimethylol propane, or trimethylol ethane for moisture retention. The content (mass %) of the moisturizing solid content in the ink is preferably equal to or higher than 0.1 mass % and equal to or lower than 20.0 mass %, and more preferably equal to or higher than 3.0 mass % and equal to or lower than 10.0 mass % with respect to the total mass of the ink. In addition to the above components, an ink which forms an ink set may contain various additives such as a pH adjustor, anti-corrosive agent, preservative, mildewproofing agent, antioxidant, anti-reduction agent, and evaporation accelerator, as needed.

An ink used in the embodiment will be explained in more detail. However, the present invention is not limited to the following example without departing from the gist of the invention. In the following description, "part" and "%" are mass criteria, unless otherwise specified.

[Preparation of Pigment Dispersions 1 to 5]

Pigment dispersions 1 to 5 were prepared by the following procedures. In the following description, the dispersant is an aqueous solution obtained by neutralizing a styrene-acrylic acid copolymer having an acid number of 200 and a weight-average molecular weight of 10,000 by a 10-mass % aqueous sodium hydroxide solution.

<Preparation of Pigment Dispersion 1 Containing C.I. Pigment Red 122>

First, 10 parts of a pigment (C.I. pigment red 122), 20 parts of a dispersant, and 70 parts of ion-exchanged water were mixed and dispersed for 3 h using a batch vertical sand mill. Then, coarse particles were removed by centrifugal processing. Further, the pigment dispersion was filtrated under pressure through a cellulose acetate filter (available from ADVANTEC) having a pore size of 3.0 µm, obtaining pigment dispersion 1 having a pigment concentration of 10 mass %.

<Preparation of Pigment Dispersion 2 Containing C.I. Pigment Blue 15:3>

First, 10 parts of a pigment (C.I. pigment blue 15:3), 20 parts of a dispersant, and 70 parts of ion-exchanged water were mixed and dispersed for 5 h using a batch vertical sand mill. Then, coarse particles were removed by centrifugal processing. Further, the pigment dispersion was filtrated under pressure through a cellulose acetate filter (available from ADVANTEC) having a pore size of 3.0 µm, obtaining pigment dispersion 2 having a pigment concentration of 10 mass %.

<Preparation of Pigment Dispersion 3 Containing C.I. Pigment Yellow 74>

First, 10 parts of a pigment (C.I. pigment yellow 74), 20 parts of a dispersant, and 70 parts of ion-exchanged water were mixed and dispersed for 1 h using a batch vertical sand mill. Then, coarse particles were removed by centrifugal processing. Further, the pigment dispersion was filtrated under pressure through a cellulose acetate filter (available from ADVANTEC) having a pore size of 3.0 µm, obtaining pigment dispersion 3 having a pigment concentration of 10 mass %.

<Preparation of Pigment Dispersion 4 Containing C.I. Pigment Black 7>

First, 10 parts of a carbon black pigment (C.I. pigment black 7), 20 parts of a dispersant, and 70 parts of ion-exchanged water were mixed and dispersed for 3 h using a batch vertical sand mill. Note that the peripheral speed in dispersion was double the peripheral speed used to prepare pigment dispersion 1. Then, coarse particles were removed by centrifugal processing. Further, the pigment dispersion was filtrated under pressure through a cellulose acetate filter (available from ADVANTEC) having a pore size of 3.0 µm, obtaining pigment dispersion 4 having a pigment concentration of 10 mass %.

<Preparation of Pigment Dispersion 5 Containing C.I. Pigment Red 149>

First, 10 parts of a pigment (C.I. pigment red 149), 20 parts of a dispersant, and 70 parts of ion-exchanged water were mixed and dispersed for 3 h using a batch vertical sand mill. Then, coarse particles were removed by centrifugal processing. Further, the pigment dispersion was filtrated under pressure through a cellulose acetate filter (available from ADVANTEC) having a pore size of 3.0 µm, obtaining pigment dispersion 5 having a pigment concentration of 10 mass %.

(Preparation of Ink)

Components shown in FIG. 17 were mixed and stirred well. After that, the resultant liquids were filtrated under pressure through a cellulose acetate filter (available from ADVANTEC) having a pore size of 0.8 µm, obtaining inks 1 to 11.

A clear ink used in the embodiment will be explained.

(Preparation of Clear Ink)

Liquid composition A with the following composition was prepared using a styrene (St)-acrylic acid (AA) copolymer A (St/AA=70/30 (mass %), a molecular weight of 10,500, and a measured acid number of 203) synthesized by solution polymerization using a free-radical initiator. Note that the basic substance was potassium hydroxide, and the content of the additive was adjusted to set the pH of the liquid composition to 8.0.

| | |
|---|---|
| styrene-acrylic acid copolymer A | 2 parts |
| glycerin | 7 parts |
| diethylene glycol | 5 parts |
| water | 86 parts |

The clear ink obtained by the above preparation is a liquid for controlling at least gloss. The clear ink is not limited to the above example as long as the same effects are obtained.

<Relationship between Glossiness and Image Clarity>

Figure 10A:
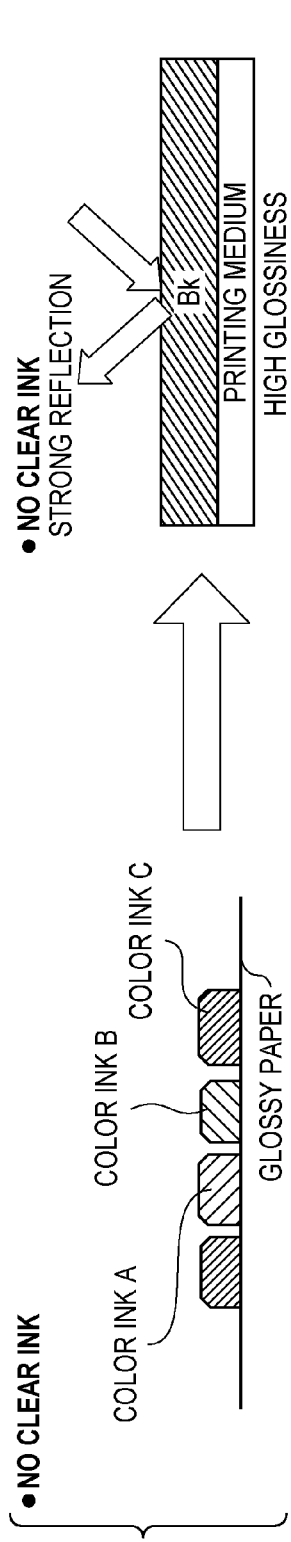
FIGS. 10A to 10C are views showing the difference in the state of a printed surface depending on the difference in superposition of color and clear inks.
Figure 10B:
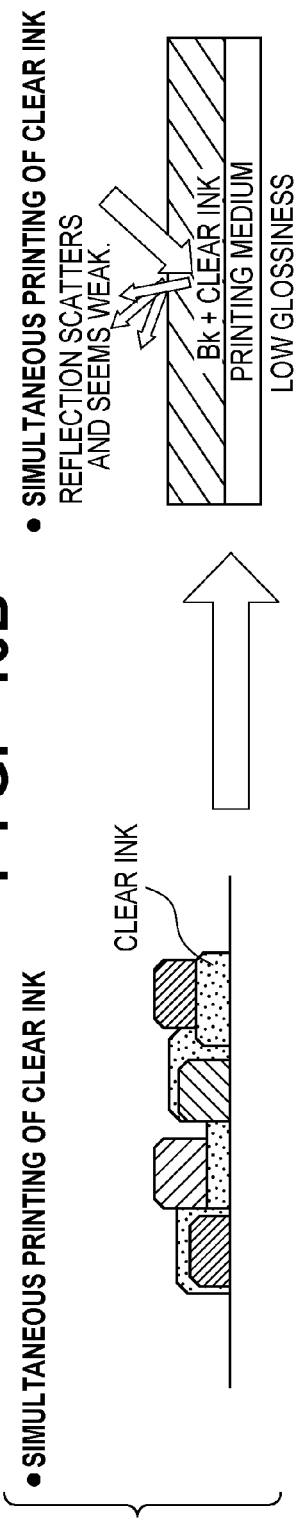
Figure 10C:
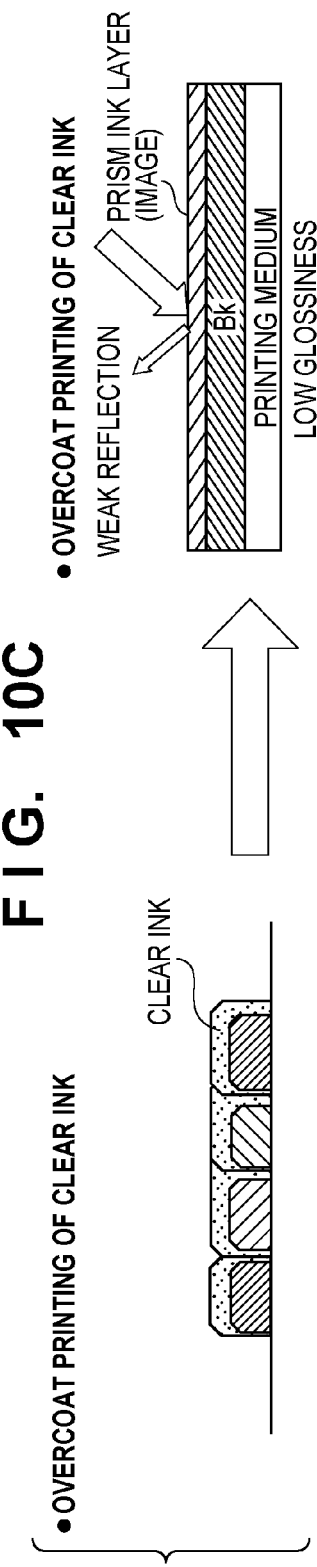

When a clear ink is printed at the same time as a chromatic color ink or achromatic color ink, image clarity and glossiness further change depending on superposition of them. FIGS. 10A to 10C are views showing the difference in the state of a printed surface depending on the difference in superposition of the clear ink. FIG. 10A shows a case in which only chromatic color inks are printed without printing the clear ink. FIGS. 10B and 10C show cases in which the clear ink is printed by simultaneous printing and overcoat printing (to be described later), respectively.

In a relatively random printing method (to be referred to as simultaneous printing), the chromatic color ink and clear ink are printed simultaneously. Because of random print timings, the clear ink is printed on the chromatic color ink in some cases, and the chromatic color ink is printed on the clear ink in other cases, roughening the printed surface. As a result, image clarity and glossiness tend to decrease (FIG. 10B).

Figure 11A:
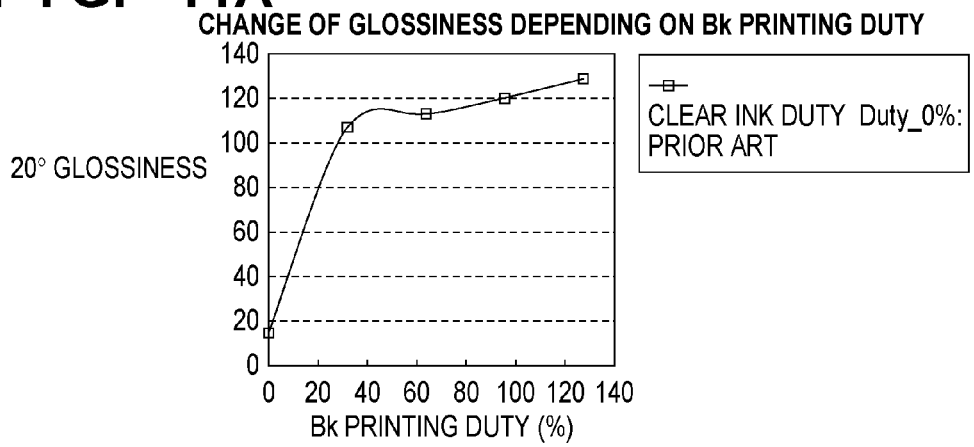
FIGS. 11A to 11C are graphs showing a change of the glossiness and black OD.
Figure 11B:
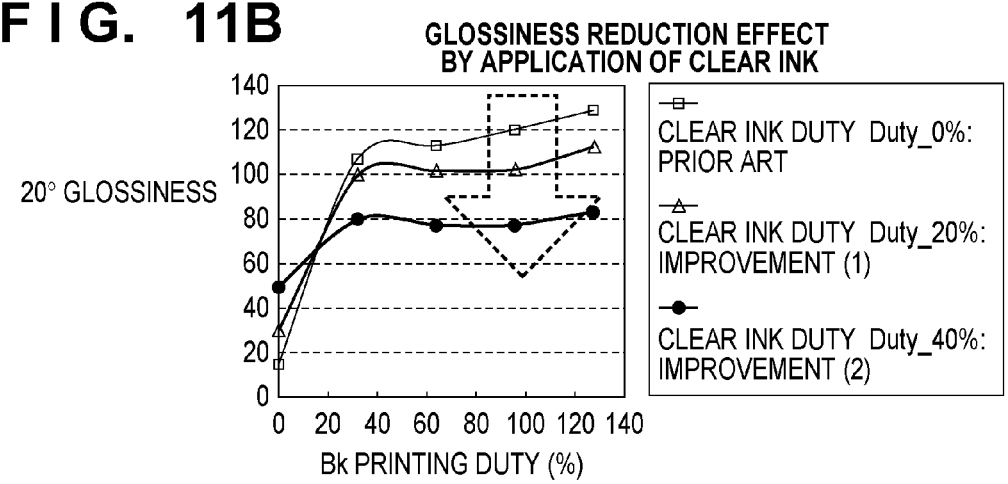
Figure 11C:
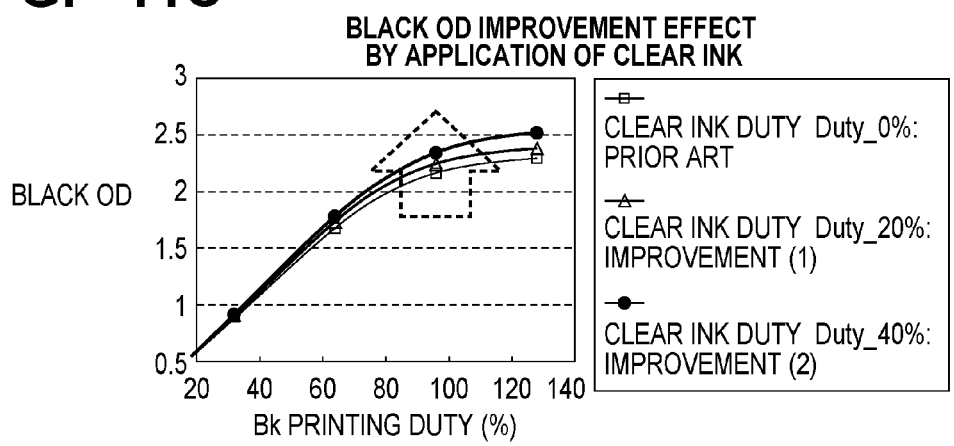

In a printing method of printing the chromatic and achromatic color inks and the clear ink at different timings, image clarity hardly drops and only glossiness tends to change greatly in accordance with the clear ink amount (FIG. 10C). Especially in a printing method of applying the clear ink later (to be referred to as overcoat printing), the image glossiness changes efficiently. More specifically, the clear ink printed in a low-glossiness region increases the glossiness in accordance with the clear ink amount. As shown in FIG. 11A, the glossiness is high at a portion where the Bk ink printing duty is high. Overcoat printing of the clear ink in this region decreases the glossiness depending on the clear ink discharging amount. This is because overcoating with the clear ink lower in refractive index than the pigment color material-containing Bk ink forms a clear ink layer on the pigment color material-containing Bk ink layer, decreasing light reflection on the uppermost surface, as shown in FIG. 10C. FIG. 11B is a graph showing a state in which glossiness further decreases as the clear ink discharging amount increases. Since the glossiness, that is, light reflection is reduced, measurement of a clear ink-applied patch by a general colorimeter reveals that the black OD is improved, as shown in FIG. 11C.

Figure 16A:
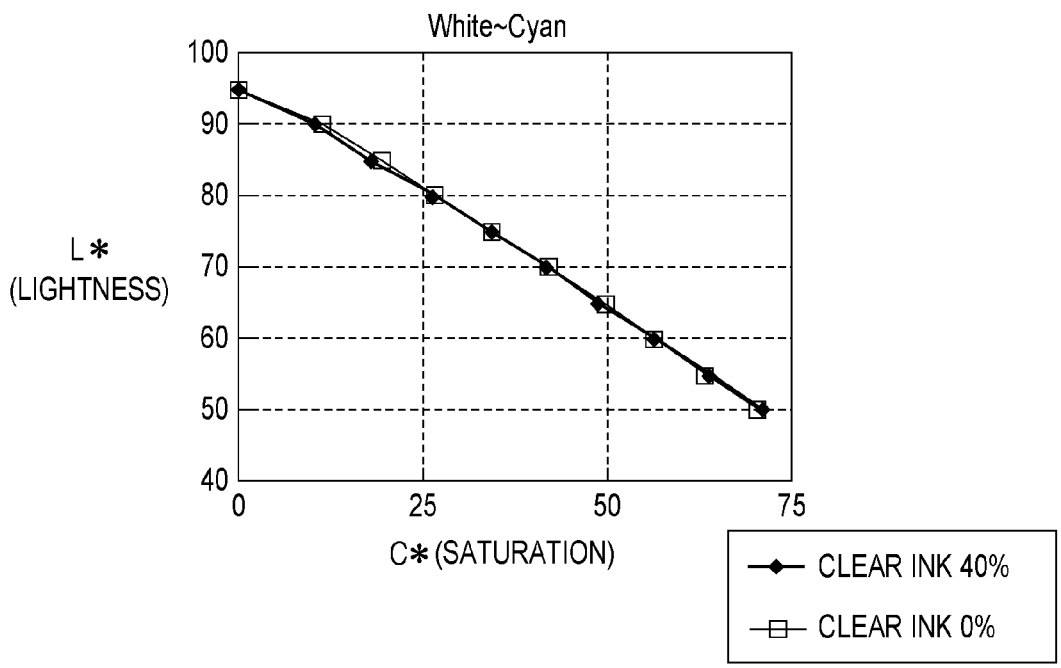
FIGS. 16A and 16B are graphs for explaining a case in which a black carbon-free color ink is used.
Figure 16B:
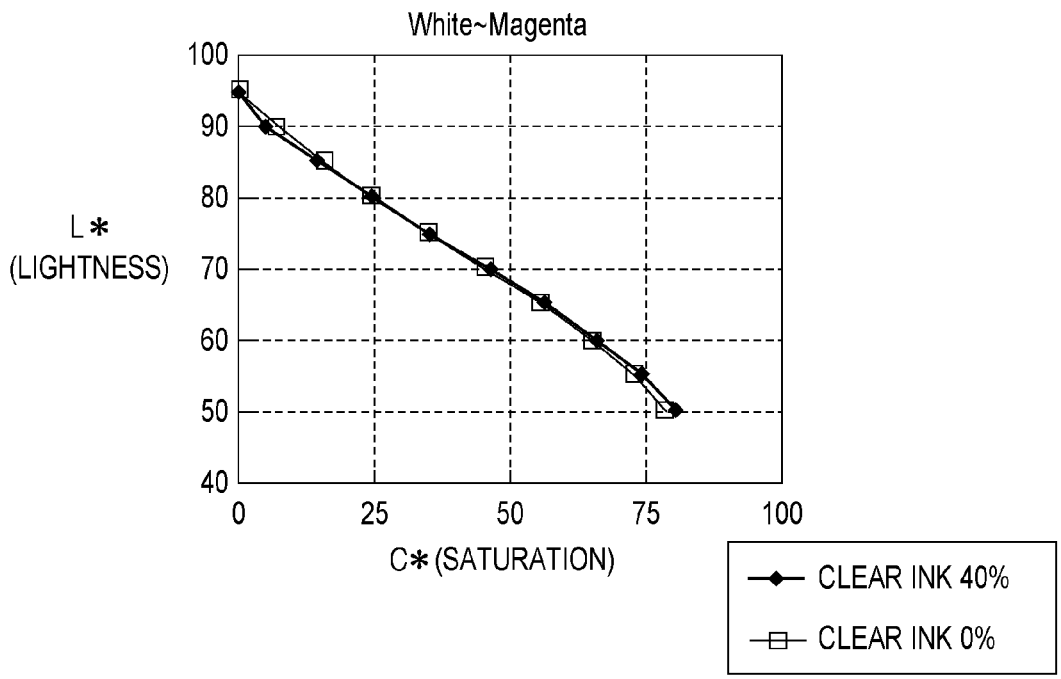

Graduation was created up to the maximum saturation using black carbon-free chromatic color inks (for example, cyan and magenta), and patches in which the clear ink was applied (clear ink printing duty=40%) and those in which no clear ink was applied were measured by the colorimeter. FIG. 16A and FIG. 16B show the results. In FIG. 16A and FIG. 16B, the ordinate indicates lightness (L*), and the abscissa indicates saturation (c*). As is apparent from FIG. 16A and FIG. 16B, the saturation hardly changes between discharging and without-discharging of the clear ink in both the use of cyan shown in FIG. 16A and the use of magenta shown in FIG. 16B.

From this, the embodiment tries to suppress an increase in glossiness in image data especially using a black carbon ink. In this case, overcoat printing of the clear ink is performed to suppress unwanted light reflection on the surface of the pigment color material-containing Bk ink. This can improve both the black OD and the gamut at a dark portion (L*<40). In the embodiment, the clear ink may be used only when the user designates the use of the clear ink or in some printing modes in which glossy paper, semi-glossy paper, or the like is used.

First Embodiment

Figure 12A:
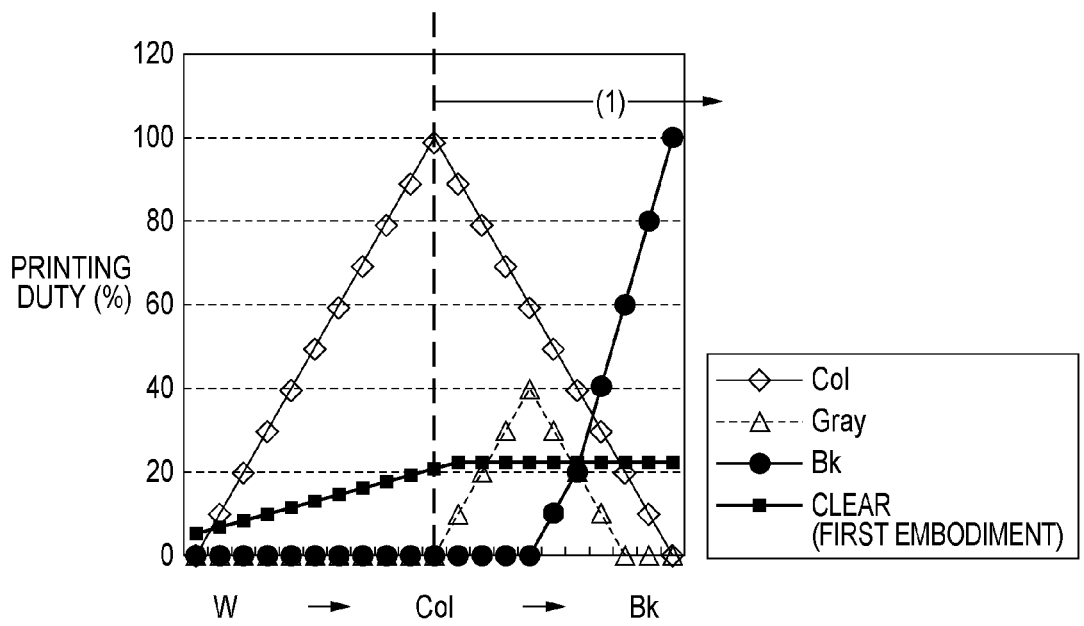
FIGS. 12A and 12B are graphs for explaining examples of the use of the clear ink on a White-Col-Bk line.

The first embodiment according to the present invention will be described. FIG. 12A is a graph for explaining an example of the use of the clear ink on a White-Col-Bk line in a given hue on glossy paper. In practice, Col inks (chromatic color inks) of a plurality of colors are adopted, and the use of color is more complicated. However, a Col ink of only one color will be explained in the embodiment for descriptive convenience.

Generally from White to Col, gradation is created by the Col ink, and the Col ink discharging amount (printing duty) is increased up to the maximum saturation. In the embodiment, a printing duty obtained when eight 3.5-pl ink droplets are printed in different areas within a pixel of 600 dpi×600 dpi serving as a unit area on a printing medium is defined as 100%. Since lightness needs to be decreased to connect Col and Bk, achromatic color inks (for example, Gray and Bk) containing pigment color materials are generally used. In the embodiment, gray is used first in consideration of graininess at the start of using black, and then Bk is used to decrease lightness.

FIG. 11A is a graph showing a change of the glossiness depending on the Bk printing duty. As shown in FIG. 11A, the glossiness of the printing medium itself is low. When one ink droplet of about 3.5 pl (duty of 12.5% per unit area and a dot diameter of about 30 μm) is printed in a pixel of 600 dpi×600 dpi, as shown in FIG. 13A, the unprinted portion is still large, the glossiness of the printing medium itself is dominant, and thus the glossiness is low. However, when two 3.5-pl ink droplets (duty of 25%) are printed in the pixel of 600 dpi×600 dpi, as shown in FIG. 13B, the printed portion occupies half the unit pixel on the printing medium, so not the glossiness of the printing medium itself but that of the pigment itself becomes dominant. Hence, the glossiness abruptly rises around the 25% duty, as shown in FIG. 11A. As the printing duty increases as shown in FIGS. 13C and 13D, almost no unprinted portion remains, and the glossiness of the printing medium itself becomes high. As for gray, the glossiness tends to rise as well.

Figure 12B:
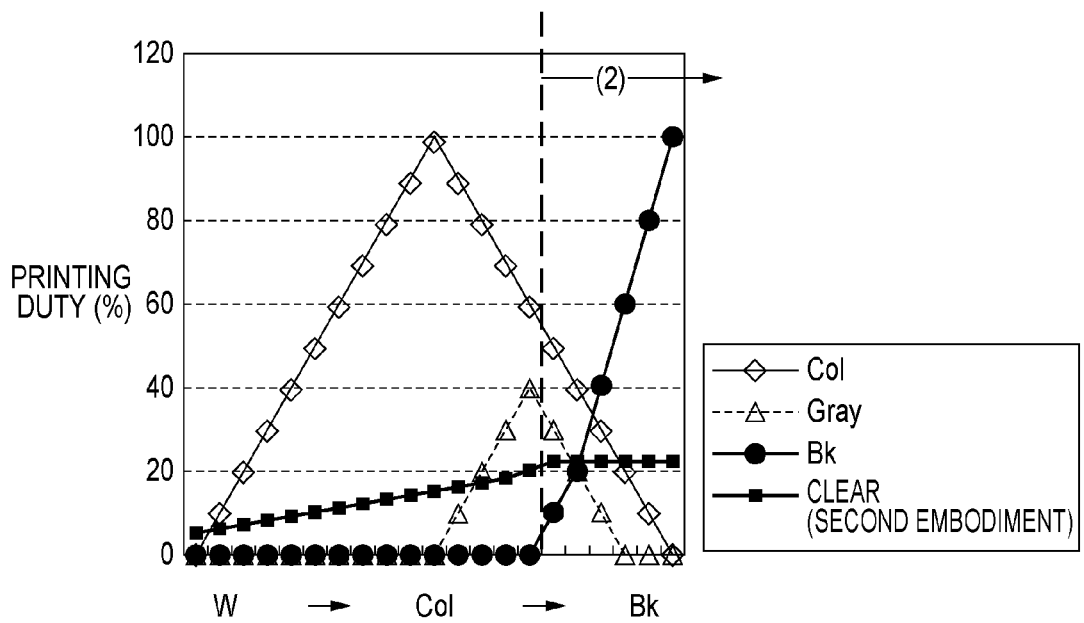

As shown in FIG. 12A and FIG. 12B, the Col ink is still dominant at the start of using the gray ink in the hue of the White-Col-Bk line, and the glossiness does not increase so much. However, the achromatic color ink containing a pigment color material becomes dominant for the gray line, increasing the glossiness.

Considering this, the discharging amount (use amount) of the clear ink assigned to the values of image data R, G, and B at the start of using at least a color using black carbon ink, that is, the gray ink, as shown in FIG. 13A, is set to be equal to or larger than the use amount of clear ink assigned to the values of image data R, G, and B before the start of using the gray ink. This can decrease the glossiness which has risen as the black carbon ink-containing ink becomes dominant. To decrease the glossiness, the clear ink use amount is preferably 20% or more though it depends on the maximum ink applicable amount of the printing medium. In this example, the clear ink discharging amount is kept constant on the way, but is not limited to this and may increase monotonously.

Second Embodiment

The second embodiment will be described. FIG. 12B is a graph for explaining an example of the use of the clear ink on a White-Col-Bk line in a given hue. In practice, Col inks of a plurality of colors are adopted, and the use of color is more complicated. However, a Col ink of only one color will be explained in the embodiment for descriptive convenience.

Generally from White to Col, gradation is created by the Col ink, and the Col ink discharge amount (printing duty) is increased up to the maximum saturation. Since lightness needs to be decreased to connect Col and Bk, achromatic color inks containing pigment color materials are used. In the embodiment, the gray ink is used first in consideration of graininess at the start of using black, and then Bk is used to decrease lightness.

The glossiness of an achromatic color ink containing a pigment color material tends to be high. The Bk ink having the highest pigment density is used dominantly around the darkest portion of the Col ink. Since the discharge amount of Bk ink is larger than that of the chromatic color ink around the darkest portion, the glossiness of the Bk ink becomes dominant. To improve the black OD, it is important to suppress the glossiness at a portion using an ink of the highest density among inks including at least the achromatic color ink and black carbon ink.

More specifically, the discharge amount of clear ink at the start of using the Bk ink of the highest pigment density is set larger than that of the clear ink before the start of using the Bk ink, as shown in FIG. 12B. In this example, the clear ink discharge amount is kept constant on the way, but is not limited to this and may increase monotonously.

When practicing the first and second embodiments, the clear ink is superposed on the uppermost surface by overcoating as much as possible, as shown in FIG. 10C. This can enhance the glossiness suppression effect by the clear ink. Overcoat printing has another effect of suppressing a decrease in image clarity. Since poor image clarity roughens the surface, the surface diffusely reflects light and seems hazy, and even the black OD seems low. Hence, overcoating capable of greatly changing only the glossiness in accordance with the amounts of color and clear inks without degrading the image clarity is desirable.

Figure 14A:
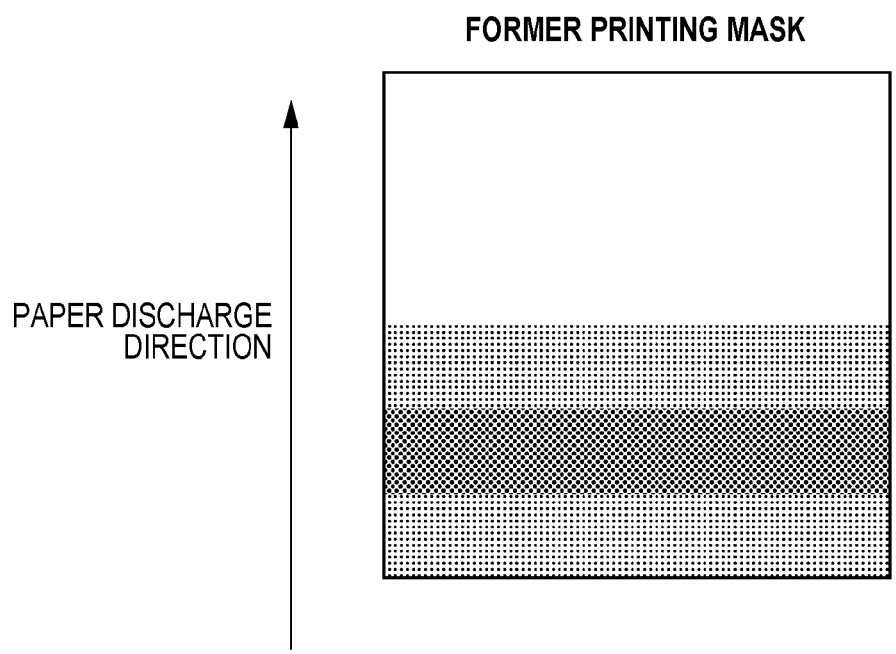
FIGS. 14A and 14B are views exemplifying masks which complete printing by six passes.
Figure 14B:
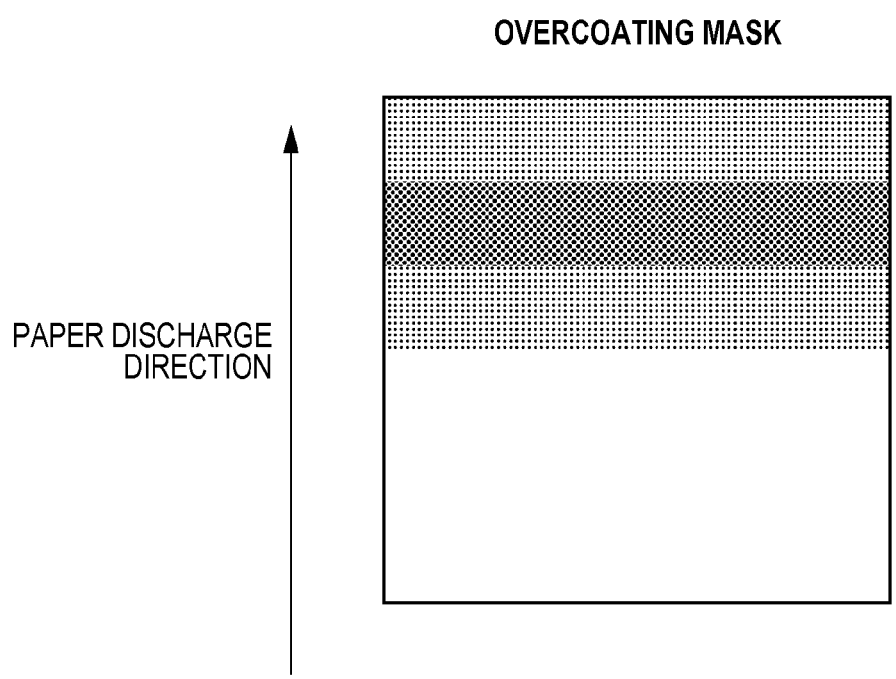

To implement overcoat printing of the clear ink, for example, masks which complete printing substantially by six passes as shown in FIG. 14A and FIG. 14B are prepared. Inks are divided into an ink group including at least an achromatic color ink (Gray or Bk) and no clear ink, and an ink group including at least the clear ink. Masks as shown in FIG. 14A and FIG. 14B are selected for the respective ink groups. FIG. 14A shows a former printing mask which completes printing by three passes of the first half out of the six passes. FIG. 14B shows an overcoating mask which completes printing by three passes of the second half out of the six passes. These masks enable overcoating of the clear ink upon completion of printing with the chromatic color inks, like FIG. 10C.

Although the 6-pass masks have been exemplified, the number of passes is not limited to this. For example, the number of passes in multi-pass printing of color inks may differ from that of passes in multi-pass printing of the overcoating clear ink. In the above-described example, the number of passes is three in both multi-pass printing of color inks and multi-pass printing of the clear ink, and printing is completed by a total of six passes. However, in 3-pass printing of color inks, a dot landing error may occur owing to variations of the mechanical components of the inkjet printer main body, variations of the conveyance precision, and the like. The dot landing error appears as local density variations, readily generating an image error such as a streak or nonuniformity. As a means for avoiding this, it is most effective to increase the number of passes in multi-pass printing, but the printing speed decreases.

However, in multi-pass printing of the colorless clear ink, the dot landing error is hardly recognized as image density variations, unlike multi-pass printing of color inks. Thus, an image error is hardly generated even with a smaller number of passes than that in multi-pass printing of color inks. From this, if an image error occurs, the number of passes for color inks is changed to four and that of passes for the overcoating clear ink is changed to two passes while maintaining a total of six passes. This method cancels an image error without changing the total number of passes. In the above embodiments, the clear ink is printed after the completion of printing of color inks. However, both the color and clear inks may be printed in some passes. Further, inks are divided into two ink groups in FIG. 14A and FIG. 14B. However, it is also possible to divide inks into three or more ink groups and sequentially print with the respective ink groups so that inks including the clear ink are printed finally. When inks are divided into three ink groups, it suffices to divide the mask into three and print.

Overcoat printing is also possible by devising the head arrangement, as shown in FIG. 15A and FIG. 15B. As shown in FIG. 15A, an ink printed last by a line printhead (that is, a nozzle array positioned most downstream in the scanning direction) may be the clear ink. As shown in FIG. 15B, clear ink nozzles may be shifted in the nozzle printing direction to print the clear ink by overcoating upon completion of printing of color inks, like FIG. 9C.

As described above, according to the embodiments, the glossiness of the pigment color material-containing Bk ink is lowered by overcoating with the clear ink. Lowering the Bk ink glossiness can reduce unwanted light reflection by the Bk ink and improve the black OD. As a result, the gamut at a dark portion is enlarged toward low lightless, improving even the reproducible color volume.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-195057, filed Aug. 31, 2010, which is hereby incorporated by reference herein in its entirety.

What is claimed is:

1. An image processing method of processing data for printing an image on a unit area of a print medium using a printhead for discharging color inks including an ink containing black carbon as a color material, and a clear ink containing no color material, comprising:

a conversion step of converting input image data into ink data corresponding to each of the color inks and the clear ink, wherein the ink data represents a use amount of each of the color inks and the clear ink in discharging the clear ink and one of the color inks to the unit area by the print head, wherein said input image data includes first image data to obtain, in said conversion step, first ink data for using the ink containing the black carbon, and second image data to obtain, in said conversion step, second ink data for not using the ink containing the black carbon, wherein, as a result of a conversion of said conversion step, the use amount of the clear ink in a case where the first ink data is converted from the first image data such that a first ink containing black carbon is discharged on the unit area becomes larger than the use amount of the clear ink in a case where the second ink data is converted from the second image data such that a second ink which is other than the first ink of the color inks is discharged on the unit area.

2. The method according to claim 1, wherein
said color ink includes a plurality of inks containing the black carbon, the plurality of inks containing the black carbon respectively have different pigment densities, and
wherein the first ink data is for using the ink containing the black carbon having the highest density, and the second ink data is for not using the ink containing the black carbon having the highest density,
wherein, as a result of the conversion of said conversion step, the use amount of the clear ink based on the first ink data becomes larger than the use amount of the clear ink based on the second ink data.

3. The method according to claim 1, further comprising a generation step of generating, based on the ink data, print data for printing by scanning the printhead a plurality of number of times in a single image region on the printing medium,
wherein in the generation step, the print data is generated to print the clear ink in scanning after said at least one type of color ink.

4. The method according to claim 1, wherein the printing medium to be printed using the clear ink is one of glossy paper and semi-glossy paper.

5. An image processing apparatus which processes data for printing an image on a unit area of a print medium using a printhead for discharging color inks including an ink containing black carbon as a color material, and a clear ink containing no color material, comprising:
a conversion unit configured to convert input image data into ink data corresponding to each of the color inks and the clear ink, wherein the ink data represents a use amount of each of the color inks and the clear ink in discharging the clear ink and one of the color inks to the unit area by the printhead,
wherein said input image data includes first image data to obtain, by said conversion unit, first ink data for using the ink containing the black carbon, and second image data to obtain, by said conversion unit, a second ink data for not using the ink containing the black carbon,
wherein, as a result of a conversion by said conversion unit, the use amount of the clear ink in a case where the first ink data is converted from the first image data such that a first ink containing black carbon is discharged on the unit area becomes larger than the use amount of the clear ink in a case where the second ink data is converted from the second image data such that a second ink which is other than the first ink of the color inks is discharged on the unit area.

6. The apparatus according to claim 5, wherein
said color ink includes a plurality of inks containing the black carbon, the plurality of inks containing the black carbon respectively have different pigment densities, and
wherein the first ink data is for using the ink containing the black carbon having the highest density, and the second ink data is for not using the ink containing the black having the highest density,
wherein, as a result of the conversion by said conversion unit, the use amount of the clear ink based on the first ink data corresponding to the clear ink becomes larger than the use amount of the clear ink based on the second ink data corresponding to the clear ink.

7. The apparatus according to claim 5, wherein the image processing apparatus is an inkjet printing apparatus having a printhead.

8. An image processing apparatus which processes data for printing an image using a printhead for discharging color inks including a first ink containing black carbon as a color material and a second ink which is other than the first ink, and a clear ink containing no color material,
wherein the second ink contains no black carbon or contains black carbon which density is less than that of the first ink, comprising:
a determining unit configured to determine a use amount of each of the color inks and the clear ink to be discharged on the unit area by the printhead based on input image data representing color of the image corresponding to the unit area; and
a controlling unit configured to cause the printhead to discharge the color inks and the clear ink according to the use amount of the color inks and the clear ink determined by the determining unit,
wherein the determining unit determines the use amount of each of the color inks and the clear ink such that the use amount of the clear ink in a case where the first ink is discharged on the unit area becomes larger than the use amount of the clear ink in a case where the second ink is discharged on the unit area.

9. The apparatus according to claim 8, further comprising a generation unit configured to generate, based on the input image data, print data for printing by scanning the printhead a plurality of number of times in a single image region on a printing medium,
wherein the generation unit generates the print data to print the clear ink in scanning after said at least one type of color ink.

10. The apparatus according to claim 8, wherein a printing medium to be printed using the clear ink is one of glossy paper and semi-glossy paper.

11. The apparatus according to claim 8, wherein the first ink is a grey ink and the second ink is a chromatic ink.

* * * * *